J. M. GILBERT.
DEMOUNTABLE RIM.
APPLICATION FILED SEPT. 15, 1910. RENEWED APR. 23, 1913.
1,078,579.
Patented Nov. 11, 1913.
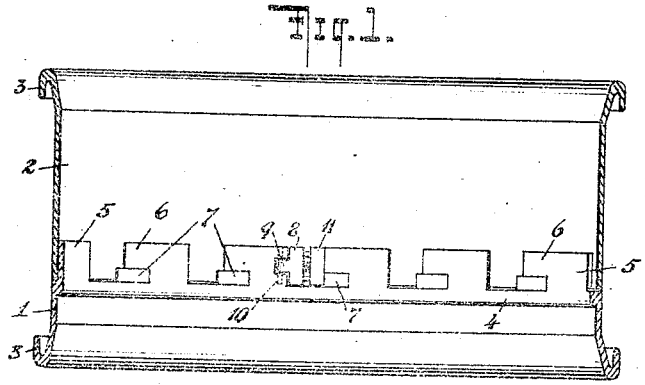
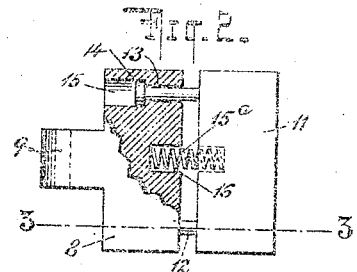
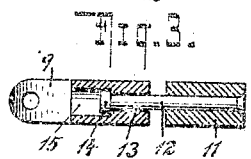
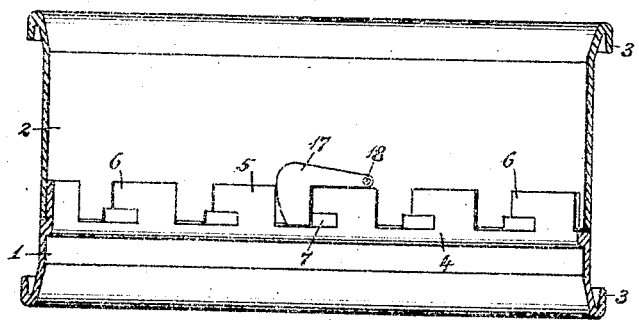
WITNESSES:
G. V. Rasmussen
John A. Stebenbeck
INVENTOR
Joseph M. Gilbert
BY
Knauth
ATTORNEYS

UNITED STATES PATENT OFFICE.

JOSEPH M. GILBERT, OF MOUNT VERNON, NEW YORK, ASSIGNOR, BY MESNE ASSIGN-
MENTS, OF ONE-HALF TO THE B. F. GOODRICH COMPANY, OF NEW YORK, N. Y., A
CORPORATION OF NEW YORK, ONE-FOURTH TO THE GOODYEAR TIRE & RUBBER
COMPANY, OF AKRON, OHIO, A CORPORATION OF OHIO, AND ONE-FOURTH TO THE
UNITED STATES TIRE COMPANY, OF NEW YORK, N. Y., A CORPORATION OF NEW
YORK.

DEMOUNTABLE RIM.

1,078,579.   Specification of Letters Patent.   Patented Nov. 11, 1913.

Application filed September 15, 1910, Serial No. 582,121. Renewed April 23, 1913. Serial No. 768,180.

*To all whom it may concern:*

Be it known that I, JOSEPH M. GILBERT, a citizen of the United States, and resident of Mount Vernon, Westchester county, State of New York, have invented certain new and useful Improvements in Demountable Rims, of which the following is a specification.

My invention relates to pneumatic tire carrying rims of the species known as auxiliary demountable rims and more particularly to rims of this kind which are made in two circumferential sections capable of being connected with and disconnected from each other through the medium of a movement relatively to each other and known as split demountable rims.

The particular object of my invention is to provide a lock which is preferably attached to one rim section so as not to readily become mislaid and which engages a portion of the other rim section to prevent any relative movement between said sections in the direction necessary to disconnect them so that accidental disengagement of the sections is prevented.

My improvement is further designed to prevent the assembled or complete rim from being placed in position on the wheel unless the sections have been actually and firmly locked together, so that the mere fact that said assembled rim may be properly positioned on the wheel is a guarantee that the lock is in operative position.

My invention will be fully described hereinafter and the features of novelty will be pointed out in the appended claims.

Reference is to be had to the accompanying drawings in which—

Figure 1 represents an inside face view of as much of a split demountable rim as is necessary to illustrate my invention; Fig. 2 is a face view of the lock on an enlarged scale and partly in section; Fig. 3 is a vertical section thereof on the line 3—3 of Fig. 2 and Fig. 4 is a view similar to Fig. 1 showing a different form of lock.

The auxiliary or demountable tire-carrying rim comprises two sections, 1 and 2, each provided with the usual holding means for the tire, which in the particular illustration comprises tire-retaining flanges 3. The section 1 is further formed with a preferably continuous flange 4 which extends substantially at right angles beyond the inner surface of said section as shown in Fig. 1 and from which project locking members 5 having locking lugs 6. These locking members and lugs extend in a direction parallel with the straight portions of the rim sections and engage and extend beyond the straight portion of the section 2 when the sections are connected. The section 2 is provided with spaced projections 7 adapted to coöperate with the locking lugs 6 to prevent separation of the rim sections in a direction parallel with the axis of said rim. These projections 7 are positioned and arranged so that they may be introduced through the spaces between the ends of the locking lugs 6 and the adjacent locking member 5, and on rotation of the rim sections relatively to each other in one direction will be moved behind said locking lugs 6 and thus lock the rim sections together. A relative movement of said sections in the opposite direction will cause said projections 7 to be slipped from behind said lugs 6 in which position no resistance will be interposed to the separation of said rim section by a movement in a direction parallel with the axis of said rim.

To prevent the rim sections from becoming accidentally disengaged or separated either while the auxiliary rim and its tire are carried in reverse or while in operative position on the wheel, I provide the lock which I will now describe. The said lock or latch member comprises a member or section 8 having a lug or projection 9 arranged to extend into a recess formed in one of the locking members 5. A pin 10 extends through said lug and into the walls of the recess and serves to pivotally secure the section or member 8 in position. A second section or member 11 similar to the section or member 8 is rigidly carried by spaced rods 12 which extend through apertures 13 formed in the said section 8. Each rod 12 is provided at its free end with an enlargement or head 14 arranged to reciprocate in a chamber 15 in said section or member 8 adjacent to each aperture 13. The heads 14 are of larger diameter than the aperture 13 and act as stops to limit the movement of the section or member 11 in one direction. A coil spring 15ª has its one end located in a socket 16 formed in the section or member 8 and its other end in engagement with the section 11 and serves to return and maintain said section or member 11 in an outward position. The normal distance, that is with the lock in an inoperative position, between the free outer edge of the section 11 and the inner edge of the section or member 8 is slightly greater than the width of the space between one of the locking members 5 and the adjacent lug 6. The sections 8 and 11 are thus pressed toward each other against the tension of the spring 15ª when it is desired to lock the rim sections against movement relatively to each other. Even in the operative position of the lock however there is a slight space between the adjacent edges of the sections 8 and 11 so that when it is desired to release the lock the sections may be further compressed and the lock easily swung upward out of its operative position. This space last mentioned is very slight and need only be enough to permit the section 11 to be disengaged from the lug 6.

It will thus be seen that after the rim sections have been connected the lock may be swung down into the space between the locking member 5 and the next adjacent lug 6. In this position the locking member engages one of the projections 7 and locks itself behind the coöperating lug 6. Any relative movement between the rim sections in a direction to unlock said sections will thus be arrested as the one projection 7 is substantially held against such movement and therefore will prevent the remaining projections 7 from being displaced. To disengage the lock, the section 11 is pressed slightly toward the section 8 after which the entire lock may be swung on its pivot out of its locking position leaving the rim sections free to be moved relatively to each other and disconnected. By making the lock as described, that is in two sections, movable toward each other, the lock is easily disengaged by hand or by means of a suitable tool if rust or dirt has caused a clogging or binding thereof.

It will be noted that in any but its locking position the lock projects inwardly beyond the inner surface of the rim sections and locking devices and prevents the rim from being placed on the wheel. In other words, if it is attempted to place the rim on the wheel with the lock in an inoperative position the said lock will abut against the felly of the wheel and act as an obstruction. It is thus absolutely necessary to secure the lock in operative position before the auxiliary rim can be combined with the wheel making it impossible to accidentally leave the rim sections unlocked. In its locked position the lock preferably lies flush with the locking members, lugs and projections and does not project beyond the same.

In the form of my invention shown in Fig. 4 the lock hereinbefore described is replaced with a latch 17 pivoted at 18 on the one rim section and having a projection 19 arranged to enter a space between one locking member 5 and the adjacent lug 6. In its operative position this projection engages said locking member 5 and also one of the projections 7 and locks it behind its coöperating lug 6. The projection 7 being on one rim section and the latch and locking member 5 on the other section relative movement between said sections is absolutely prevented when the latch is in its operative position. To unlock the section, the latch is simply swung on its pivot to remove the projection 19 from the space between the locking member 5 and lug 6 or in other words from engagement with the locking member 5 and projection 7. This latch operates in a direction parallel with the inner surface of the rim section and preferably lies flush with the locking member and projections.

Both forms of my invention thus provide a reliable and easily operated lock which is preferably connected with one rim section and therefore cannot become lost or misplaced.

A lock substantially the same as the form of my invention as illustrated in Figs. 1, 2 and 3 of the present drawings is shown and described in my co-pending application Serial No. 545,647 filed February 24, 1910.

Various changes may be made within the scope of the claims without departing from the spirit of my invention.

I claim:

1. The combination of a tire carrying rim comprising two sections movable relatively to each other, means for securing said sections together in a single structure against relative movement in an axial direction and against relative rotative movement in one direction and locking means resilient in a circumferential direction for preventing relative rotative movement of said rim sections in the opposite direction.

2. The combination of a tire carrying rim comprising two sections movable relatively to each other, means for securing said sections together in a single structure and locking means on one of said sections for preventing said relative movement, said locking means comprising two members mounted to slide on each other in a circumferential direction.

3. The combination of a tire carrying rim comprising two sections movable relatively to each other, means for securing said sections together in a single structure, locking means on one of said sections for preventing said relative movement, said locking means comprising two members movable toward and from each other and a spring for normally pressing said members away from each other.

4. A lock for split demountable tire carrying rims comprising one member having a lug adapted for connection with a rim section, and provided with apertures, rods slidably mounted in said apertures and a second member rigidly secured to said rods.

5. A lock for split demountable tire carrying rims comprising one member having a lug adapted for connection with a rim section, and provided with apertures, rods slidably mounted in said apertures and a second member rigidly secured to said rods, and means on said rods for limiting the movement thereof in one direction.

6. A lock for split demountable tire carrying rims comprising one member having a lug adapted for connection with a rim section, and provided with apertures, rods slidably mounted in said apertures and a second member rigidly secured to said rods, and means on said rods for limiting the movement thereof in one direction and resilient means having a tendency to press said members away from each other.

In testimony whereof, I have hereunto set by hand in the presence of two subscribing witnesses.

JOSEPH M. GILBERT.

Witnesses:
JOHN A. KEHLENBECK,
FRITZ ZIEGLER, Jr.